Aug. 13, 1968   S. M. BAKER ET AL   3,396,858
LOAD HANDLING APPARATUS HAVING RETRACTABLE STABILIZING ARM
Filed Oct. 23, 1965   4 Sheets-Sheet 1
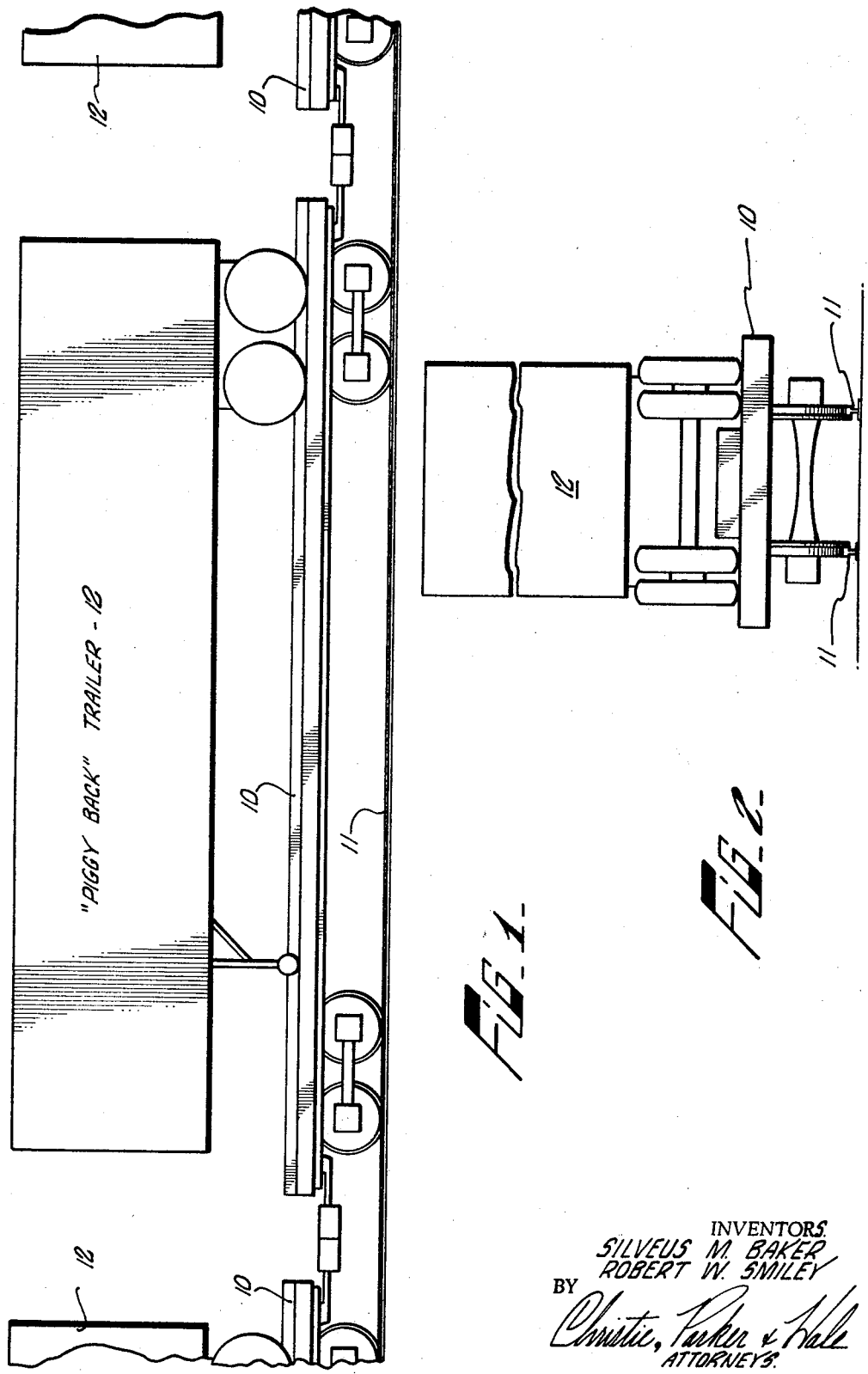
INVENTORS.
SILVEUS M. BAKER
ROBERT W. SMILEY
BY
Christie, Parker & Hale
ATTORNEYS.

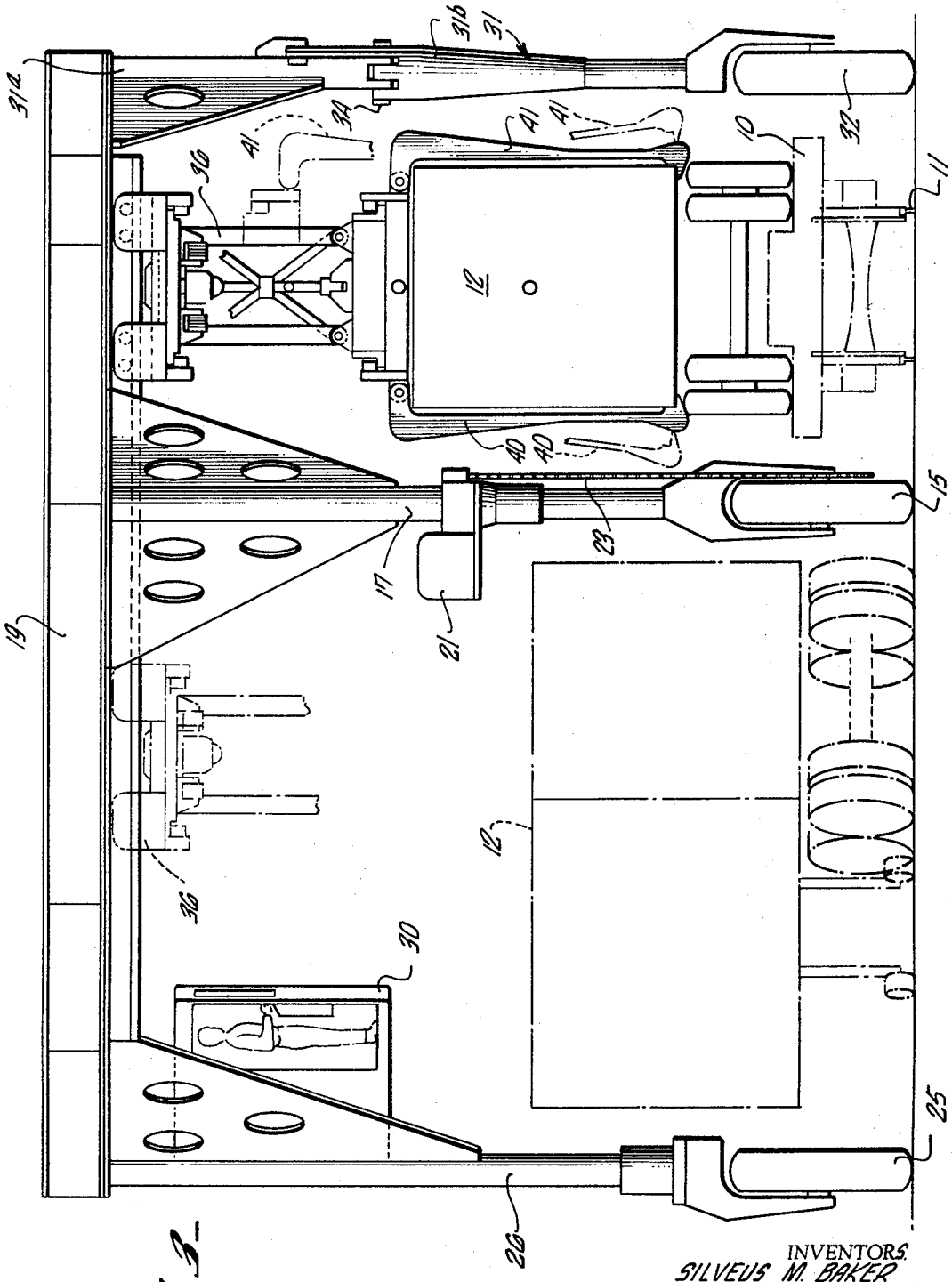

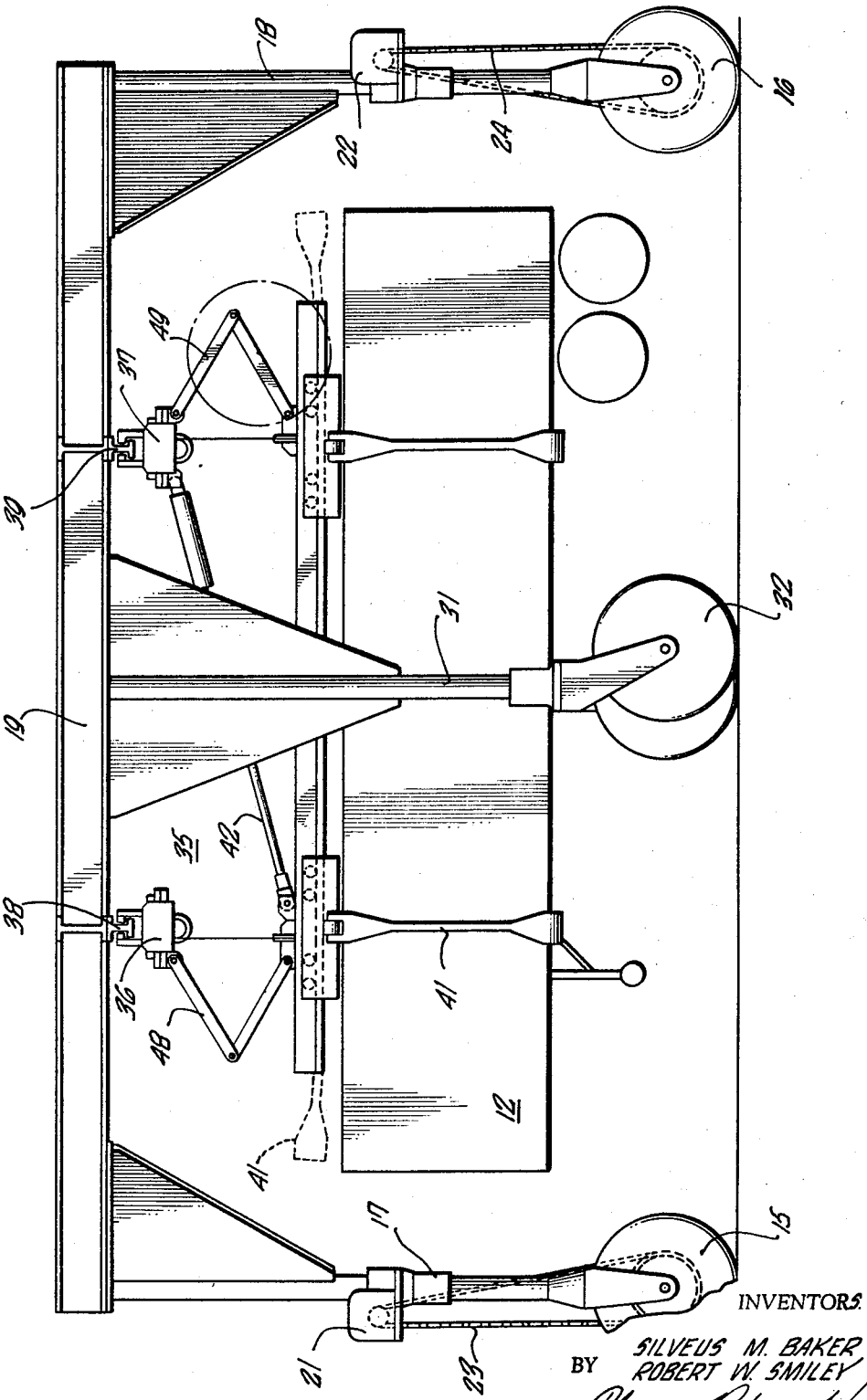

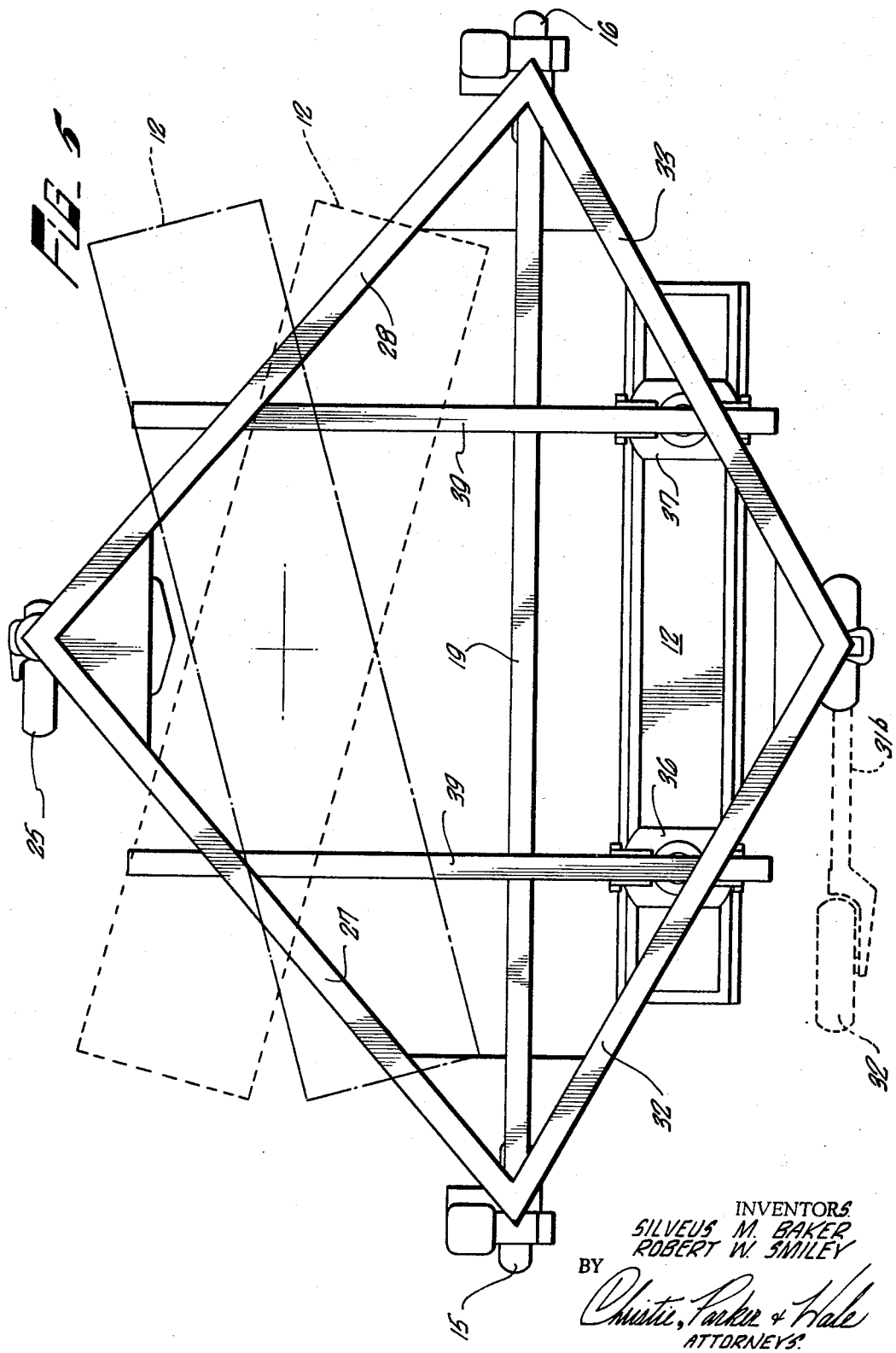

United States Patent Office 3,396,858
Patented Aug. 13, 1968

3,396,858
LOAD HANDLING APPARATUS HAVING
RETRACTABLE STABILIZING ARM
Silveus M. Baker, Arcadia, and Robert W. Smiley, La
Canada, Calif., assignors to Royal Industries, Inc.
Filed Oct. 23, 1965, Ser. No. 502,865
2 Claims. (Cl. 214—38)

ABSTRACT OF THE DISCLOSURE

The apparatus of the invention comprises a frame-like structure for defining a self-powered vehicle that may be independently propelled adjacent a load by means of 3 or 4 wheels. The fourth wheel of the frame-like structure is mounted to a movable arm to allow the frame-like structure to be driven astride a load by means of the three wheels and then moving the arm over the load and into engagement with the ground to allow the load handling apparatus to be positioned over the load to be handled. The structure for the fourth wheel further functioning for balancing the frame-like structure during load handling.

---

The present invention is directed to load handling apparatus and to a method of handling loads comprehending an improved trailer handling vehicle particularly adapted for loading and unloading "piggyback trailers" to and from a railroad car.

One of the current forms of transportation involves transporting objects through a combination of truck trailers and railroad cars. The objects to be transported are generally stored in a truck trailer and are carried by the truck trailers, usually over short distances and areas not serviced by railroad trains. When the object is to be transported long distances, the truck trailers are driven to a railroad yard and the trailers are detached from the trucks and loaded onto a railroad car, particularly adapted for transporting the truck trailer. The trailer is then hauled by the railroad train to a distant point at which point the truck trailer is unloaded from the railroad car and coupled to a truck once again for local transportation. This type of transportation is commonly referred to as "piggybacking." The type of truck trailer that is transported by rail in this fashion is commonly known as a "piggyback trailer."

At the present time, there are a number of devices, apparatus and vehicles for handling piggyback trailers. Specifically, the prior art types of self-powered vehicles for loading and unloading piggyback trailers from a railroad car necessitate that the load handling apparatus approach the railroad car to be operated on by driving the vehicle to a location allowing the tracks to be straddled and then driving the vehicle to a load handling location for loading or unloading the trailers to or from the selected railroad car. This, of course, is time consuming and is particularly time consuming when the objects to be handled are stored on the railroad cars in a non-sequential order. When the railroad cars to be operated on are arranged in successive order on the tracks, this type of prior art vehicle may be readily moved to successive cars for operating thereon. However, when the cars are not arranged in a successive order, it requires that the load handling vehicle be driven from the tracks and the cars reapproached to allow the load handling operation. Alternatively, it would require the rearranging of the cars on the tracks to allow for these loading and unloading operations an even more time consuming operation.

The present invention provides an improved method and apparatus for load handling operations that is particularly adapted to conveniently allow piggyback trailers to be loaded to and from a railroad car irrespective of the arrangement of the railroad cars and the piggyback trailers thereon. The present invention allows the railroad cars to be approached from a single side, while permitting the loading and unloading of the objects from the car or the piggyback trailers without any risk of overturning the load handling vehicle during the handling operations. The method and apparatus of the present invention produces a relatively inexpensive load handling vehicle and a method that is time saving relative to the prior art methods of operation.

From a method standpoint, the present invention includes the steps of providing a self-powered vehicle for loading and unloading an object from a railroad car and capable of approaching the railroad car as it is situated on the railroad tracks from only one side of the tracks, approaching the railroad car to be operated on from a preselected side of the tracks and, then, during the handling operation temporarily supporting the vehicle from the non-approached side of the railroad car for allowing an object to be loaded onto the railroad car or allowing an object to be unloaded therefrom.

From a structural standpoint, the present invention comprehends load handling apparatus comprising a self-powered vehicle mounting a movable overhead lifting means for lifting objects and moving the objects from one storage position to another storage position, said vehicle further mounting a retractable or movable stabilizing arm adapted to be passed over a storage location for an object including over the object when in said storage location, the retractable arm being capable of being moved into a stabilizing position for balancing the vehicle while an object is being handled and includes control means mounted on the vehicle for allowing an operator to handle an object.

These and other features of the present invention may be more fully appreciated when considered in the light of the following specifications and drawings in which:

FIG. 1 is a longitudinal elevational view of a typical arrangement of railroad cars illustrating a series of piggyback trailers loaded on the railroad cars;

FIG. 2 is an end elevational view of a piggyback trailer loaded on a railroad car;

FIG. 3 is a side elevational view of the load handling apparatus of the present invention illustrated in an unloading position with a railroad car and showing a piggyback trailer in its unloaded storage location in dotted outline;

FIG. 4 is an end elevational view of the load handling apparatus of the present invention shown with a load in transit; and FIG. 5 is a top plan view of the load handling apparatus showing the retractable arm in dotted outline and the trailer as it may be skewed relative to the load handling apparatus.

The load handling apparatus comprising the invention will now be examined in detail. Although the invention is adaptable to a multiplicity of load handling applications, the invention will be more evident when it is described for handling piggyback trailers. To this end, the method and apparatus of the present invention is applicable for both loading and unloading piggyback trailers from a railroad freight car. Accordingly, the invention will be specifically described as it is applied for loading and unloading piggyback trailers.

Referring to FIGS. 1 and 2, it will be seen that the series of railroad flat cars 10 are shown arranged on the railroad tracks 11 in a sequential order, whereby each railroad flat car stores a piggyback trailer 12. The flat cars 10 and the piggyback trailer 12 are of the usual commercial construction, as well as the method and apparatus for storing the trailers 12 on the railroad cars 10. It will be evident from viewing FIGS. 1 and 2 that a method and apparatus for loading and unloading the piggyback trailer 12 may be readily accomplished when the load handling apparatus provided straddles the railroad track and handles the trailer in this location. It should also be evident that the trailers 12 may be easily handled when the trailers are stored on the railroad cars 10 in the sequential order illustrated, and in that manner the cars may be operated on by simply moving the load handling apparatus along the tracks from car to car. Although this is a convenient arrangement for handling the trailers when the trailers are stored in a sequential order, it is an inconvenient and time consuming procedure when the trailers are stored in random fashion and/or selected trailers or railroad cars must be operated that are arranged in a non-sequential order. This type of prior art device requires that the load handling apparatus be driven off the tracks and into a new location to operate on the selected railroad cars.

The load handling apparatus of the present invention comprises an upstanding frame-like structure constructed as a self-powered vehicle. The frame-like structure is defined by a pair of spaced apart driving wheels 15 and 16 suitably supported by respective driving arms 17 and 18 which are secured to a longitudinally extending supporting beam 19 comprising the frame-like structure. Each of the arms 17 and 18 mount an individual drive motor 21 and 22 that is illustrated as coupled to the corresponding wheels 15 and 16 in a driving relationship by means of individual chain drives 23 and 24. It will, of course, be appreciated that any other conventional drive means may be employed. A third wheel, identified by the reference character 25, is mounted with the frame-like structure in a laterally spaced relationship with regard to the drive wheels 15 and 16, and is mounted to a supporting arm 26 in a relationship whereby the wheel 25 is constructed and defined to be free castering. The arm 26 is mounted to a pair of beams 27 and 28 that extend from the uppermost extremity of the drive arm 17 and 18, respectively, whereby the three wheels and the supporting beam structure essentially form a triangular frame-like structure that rests in an upright position. The self-powered vehicle includes a control cab 30 shown arranged adjacent the drive arm 26 in an elevated position relative to the ground to allow the operator to have a clear view of a load being operated on, including a piggyback trailer 12 stored on the railroad car 10. The controls for the self-propelled vehicle for the drive motors 21 and 22 are accessible to the operator within the cab 30 and, also, the means for steering the vehicle are accessible to the operator at the cab 30.

An important feature of the present load handling apparatus is the provision of a retractable arm 31 mounting a fourth wheel 32 that is spaced outwardly of the drive wheels 15 and 16 and on the opposite side thereof from the wheel 25. The movable arm 31 is suspended in the same general fashion as the arm 26 for the wheel 25 and in substantial alignment therewith. Specifically, the arm 31 depends from a pair of beams 32 and 33 that are secured to the beams 27 and 28 at the upper extremities of the drive arms 17 and 18 to define a further triangle with the longitudinal beam 19. The wheel 32 is mounted to the movable arm 31 in a conventional fashion to be non-castering. As illustrated, the arm 31 includes a rigid portion 31ª mounted to the beams 32 and 33 and is connected to the lower movable portion 31ᵇ by means of a pivot pin 34 to allow the portion 31ᵇ to be swingable thereabout. The location of the pivot pin 34 is defined relative to the total height of the piggyback trailer 12 when mounted on a railroad car 10 to allow the arm 31 to be moved over the trailer 12 when the trailer is stored on the car 10, as best appreciated by examining FIG. 3. The controls for operating the movable arm 31 are of conventional construction (not illustrated) and are also accessible to the vehicle's operator at the cab 30. Although the movable arm 31 has been described and illustrated as being swingable to allow the vehicle to be moved over the trailer 12, it should be also appreciated that any other convenient arrangement may be embodied, such as a telescoping arm.

The provision of the arm 31 is an important feature of the invention in that it allows the vehicle to be readily moved into a position to allow the vehicle to straddle both sides of the railroad tracks 11 for load handling operations while allowing a railroad car to be approached only from a single side and to be driven away from the car after the load handling operation is completed. It should also be noted that the vehicle may be driven with the wheel 32 in engagement with the ground or out of engagement therewith, in accordance with the particular application. The retractable arm 31 is constructed and defined to prevent any overturning of the vehicle during a load handling operation and is an important function of the arm. The arm 31, then, functions as a temporary stabilization for the vehicle.

The load handling apparatus further includes lifting means for handling trailers 12 or similar objects and moving them from one storage location to a second storage location. Specifically, the lifting means illustrated comprises an overhead movable crane system 35. The crane system 35 comprises a pair of movable, overhead crane units 36 and 37 mounted to travel on a pair of I-beams 38 and 39, respectively. The I-beams 38 and 39 are mounted in spaced apart parallel relationship intermediate the drive wheels 15 and 16, as illustrated. Specifically, the I-beam 38 is secured to the beams 27 and 32 while the I-beam 39 is similarly secured to the beams 28 and 33. The cranes are movable longitudinally of the beams 38 and 39 to carry a load such as a trailer from one storage location to another. For example, as illustrated in FIG. 3, the crane can carry the trailer 12 from the railroad car 10 and position it adjacent the tracks 11 when the crane is operated to move it along the rails 38 and 39 to position the trailer 12 with the frame of the load handling vehicle, as shown in dotted outline in FIG. 3. The controls for the crane are of conventional construction and are also adapted to be accessible to the operator at the cab 30. The cranes in this instance include movable lifting hooks 40 and 41 that are suspended to be engageable with the underside of the trailer 12, as illustrated, to allow the trailer 12 to be lifted off the railroad car 10 and moved towards the opposite extremity of the load handling vehicle.

It will also be appreciated by those skilled in the arts that during the handling of a heavy object such as a trailer, that the object is subject to sway. Accordingly, some means for controlling or minimizing the longitudinal sway is necessary. In accordance with the present invention, longitudinal sway is controlled by means of a conventional sway brace and damper identified by the reference character 42 and best illustrated in FIG. 4. The sway brace 42 extends from the crane 37 adjacent the I-beam 39 to the crane 36, adjacent the supporting structure for the hooks 41. The brace 42 is longitudinally movable with the vertical movements of the cranes and which movements are damped by the associated damper. Lateral sway braces 48 and 49 for the cranes 36 and 37, respectively, are also provided in the form of hinged links. This sway brace arrangement has been found to be convenient to control the sway and yet the load or trailer may be skewed up to an angle of approximately 15 degrees in either direction for placing the trailer 12 on the ground. This skew angle in either direction is illustrated in FIG. 5 by the dotted outline of the trailers 12.

With the above structure in mind, the method of handling a load with the vehicle of the present invention will be described. The operation to be first described will be the unloading of a piggyback trailer 12 from a railroad flat car 10. In order to initiate the operation, the railroad car 10 is approached by the self-propelled vehicle of the invention from one side, preferably with the retractable arm 31 in a retracted position to allow the vehicle to pass over the trailer so that the arm 31 may be moved into engagement with the ground on the non-approached side of the railroad flat car 10. With the arm 31 in this position, the vehicle will be temporarily stabilized and the load handling operation or unloading operation may commence. For this purpose, the hooks 40 and 41 are placed in position to secure the bottom of the trailer body proper and the trailer is hoisted upwardly by the cranes 36 and 37. The trailer 12 is hoisted upwardly to allow the wheels thereof to clear the railroad car 10 and 15 then moved horizontally to a position laterally of the railroad tracks 11. The new storage location for the trailer 12 will generally be within the framework of the load handling vehicle and, accordingly, the trailer will be lowered to the ground by the cranes 36 and 37 and released therefrom.

If the next unloading operation is to take place at the adjacent railroad car 10, the vehicle in its stabilized arrangement may be driven along the tracks to unload the adjacent trailer or object in the same fashion as described. If the object or trailer to be unloaded, however, is at a location other than an adjacent location, the stabilizing arm 31 must be retracted and the vehicle driven to approach the railroad flat car storing the selected object to be unloaded or handled. After approaching the desired location, the stabilizing arm is again lowered and the steps previously described are repeated.

It should also be appreciated that the loading of an object or a trailer in accordance with the present invention is essentially identical to the unloading operation. In this instance, the stabilizing arm 31 is placed to cause the vehicle to straddle the tracks 11 and then a trailer, for example, such as the trailer 12 shown in dotted outline in FIG. 3, is hooked with the crane system 35, moved vertically upwardly a distance to clear the railroad flat car 10 and then horizontally over to the car 10 to overlie the car, and then dropped onto the car 10. The crane system 35 is then disengaged and the trailer is in position to be hauled in the "piggyback" fashion.

What is claimed is:

1. Load handling apparatus comprising a frame-like structure for defining a self-powered vehicle including a pair of spaced apart driving wheels arranged in alignment and a third wheel laterally spaced from said pair of driving wheels to maintain the frame in an upright, driving position with said wheels, said frame including a portion extending outwardly of the driven wheels and on the opposite side thereof from said third wheel, said portion including a movable arm mounting a fourth wheel movable into and out of engagement with the ground and when arranged out of engagement allowing the said portion to be driven over a load to be handled including a load mounted on a railroad car, drive means coupled to said driving wheels for propelling and steering said frame-like structure, movable load handling apparatus carried by said frame-like structure, and control means for operating the load handling apparatus, the drive means and said movable arm whereby said load handling apparatus may be moved over a load to be handled when the movable arm is positioned thereover and moved into engagement with the ground.

2. Load handling apparatus as defined in claim 1 wherein said movable arm is constructed and defined to be driven over a "piggyback" trailer when stored on a railroad car and further constructed and defined by balancing any tendency of overturning during the handling of a trailer or the like when placed in engagement with the ground.

References Cited

UNITED STATES PATENTS

| 2,504,232 | 4/1950 | Smith | 214—75 |
| 3,090,494 | 5/1963 | Thiele | 212—13 |
| 3,176,853 | 4/1965 | Baudhuin et al. | 212—14 |
| 3,241,686 | 3/1966 | Hurst | 212—14 X |

FOREIGN PATENTS

| 498,182 | 10/1919 | France. |
| 906,138 | 9/1954 | Germany. |

ROBERT G. SHERIDAN, *Primary Examiner.*